Aug. 30, 1966  R. A. GULICK  3,269,693
BALL VALVE SEAT
Original Filed Feb. 4, 1963
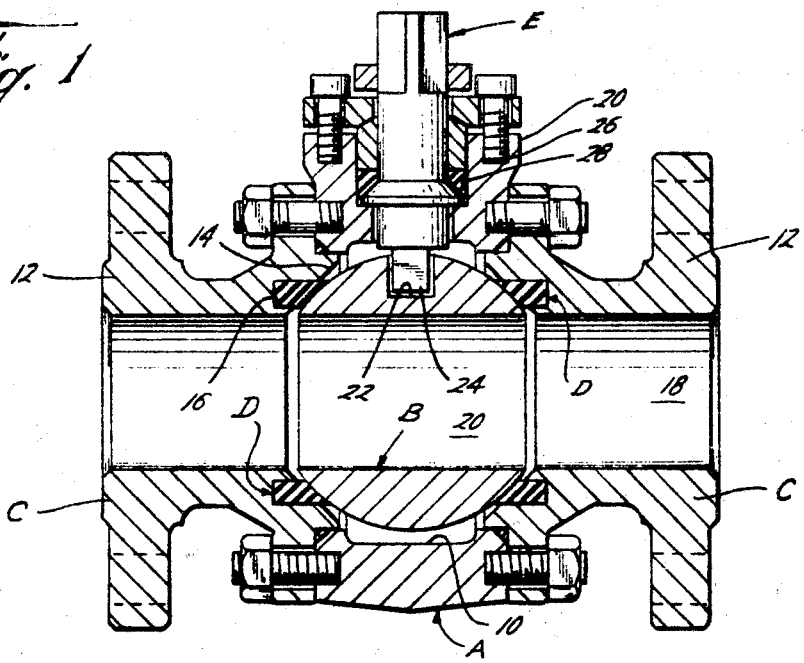
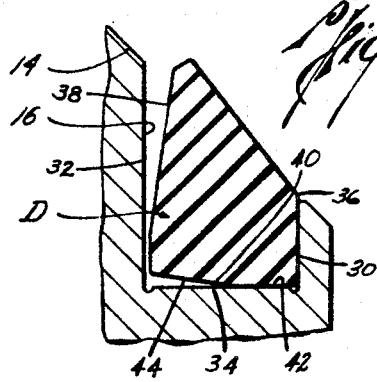
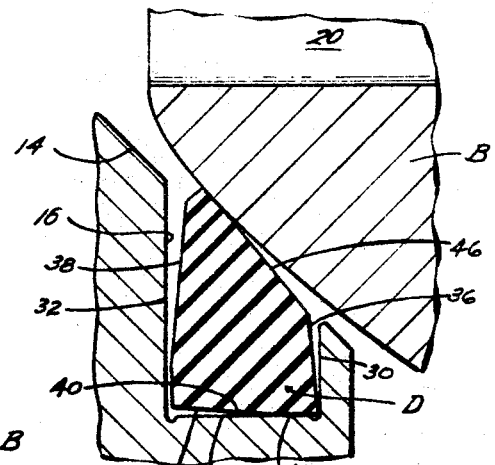
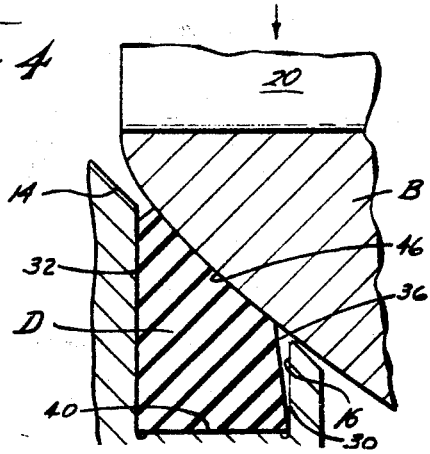
Ronald A. Gulick
INVENTOR.
BY Russell E. Schloff
ATTORNEY

3,269,693
BALL VALVE SEAT
Ronald A. Gulick, Sugar Land, Tex., assignor to ACF Industries, Incorporated, New York, N.Y., a corporation of New Jersey
Continuation of application Ser. No. 256,006, Feb. 4, 1963. This application May 24, 1965, Ser. No. 461,597
4 Claims. (Cl. 251—172)

This application is a continuation of my copending application Serial Number 256,006, filed February 4, 1963, now abandoned.

This invention relates to spherical plug valves, or as they commonly referred to "ball valves," and more particularly to seats for ball valves.

The most common type of ball valve presently in use has a rotatable spheroidal shaped valve member which is positioned between two opposed seat members, which may be formed of materials such as nylon or a fluorocarbon plastic, such as polytetrafluoroethylene, more commonly known under its trademark of "Teflon," or polychlorotrifluoroethylene, more commonly known under its tradename of "Kel-F." These valves are so designed that the seats are under compression deformation, that is, each seat is compressed between the valve member and an end wall of the body to build up an internal force in the seat member which causes the seat member to maintain intimate contact with the spherical surface of the valve member and the end wall of the body, thereby establishing a seal between the body and the seat member and a seal between the valve mmeber and the seat member. Ball valves are a mass-produced item and in order to prevent excessive costs it is desirable that each component used in making up the valve has a reasonable manufacturing tolerance. Under the minimum of tolerance conditions, there must be at least contact between the ball and seat. As any one of the components increase in size within its tolerance limit, the interference between the valve member and seat increases. The stackup of these tolerances will increase the bearing stress between the seat and the spherical surface of the valve member resulting in a high bearing load. It has been found that if such a valve remains unoperated for a long period of time the torque required to operate the valve will be extremely high. After initial operation, the amount of breaking torque decreases markedly. Upon investigation, it appeared that there was a minute amount of migration of the material composing the seat which flows under pressure into the minute surface irregularities of the spherical surface of the valve member, thereby requiring that a small amount of the seat material be sheared at the initial breakaway torque condition. It is apparent that the amount of bearing load between the valve member and seat will have a direct relationship upon the amount and speed of seat material migration. Thorough investigation appears to bear this out since valves with low interferences generally have less breakaway torque buildup than those with high interference. Accordingly, it is apparent that a seat arrangement is required which will not produce high compressive deformation type loading.

In order to prevent the high compressive deformation type loadings, the seat of the present invention does not rely upon compressive deformation loading, but instead utilizes hoop or tensile deformation to obtain contact between seat and valve member at assembly. It has been found that by employing hoop deformation greater deformation of the seat can be obtained without a resulting excessive increase in bearing load between the valve member and the seat.

Accordingly, an easily assembled valve results which will accept a broader stackup of tolerances of the various valve components without materially increasing the bearing load between the valve member on application of pressure. Also, there will be spring-back of the seat when the pressure is released to a much greater extent than that encountered when the seats are under compressive deformation. To accomplish this, the seat of the present invention is radially deformable. There is not sufficient volume of Teflon to produce compressive stresses during the assembly of the valve. The only stresses which will be encountered will be hoop stresses (tensile) causing the end of the seat facing the valve member to deflect or roll outward away from the valve member causing such end of the seat to deflect or roll outward away from the valve member being restrained by those stresses within the Teflon itself. Based on the amount of movement and the size of the seat, these stresses should not exceed the proportional limit of the Teflon and hence almost complete recovery should be effected. Naturally, a small amount of compression of the surface will occur, however, only as much bearing pressure in compression can be exerted as the hoop strength of the Teflon will allow.

In the past, a number of valve designs have been developed which utilize seat members which are so designed that at least portions thereof are movable by the spherical plug in a direction generally axially of the valve bore. It is intended that this seat movement allow for the stackup of tolerances present in mass produced valves in addition to allowing for movement of the plug member by the pressurized fluid controlled by the valve. Seat-plug relationships of this nature are satisfactory to form a fluid-tight seal only if the seat material is relatively soft or if the working surface of the spherical plug member is extremely smooth neither of which requirements is generally referred to as satisfactory from the standpoint of cost and reliability. Since the seat material is movable laterally and is not forced to expand radially, the range of force required for movement of the seat is very small thereby reducing the probability of a fluid-tight seal until the seat is moved sufficiently to engage a rear support surface.

The present invention overcomes these shortcomings by causing movement of the valve seat in a radial or substantially normal direction with respect to the bore of the valve. Since the seat material of the valve is expanded radially developing hoop or tensile stresses rather than merely shifting the flexible portion of the valve seat, there is a substantially higher degree of initial seal-plug load without actual interference thereby resulting in an adequate seal at all pressure ranges. The modulus of elasticity of the seat material is, therefore, fully and effectively used in all pressure ranges. Since higher initial interference is developed because of the tensile stressing of the seats, greater dimensional surface finish tolerances of the spherical plug engaging the seats is allowed.

Another disadvantage is providing seat members which are moved axially by the plug member involves the deposit of solid material in the bore between the seats and the seat support wall of the valve. The valve seat may not allowed to move axially if solid material has been deposited in the bore between the seat and valve body and an extremely high torque may be required to impart rotation to the valve member.

Because the tensile or hoop deflection of the seat members of the present invention is directed radially of the valve bore, the rotation of the seat members will always be such that the surfaces in contact with the lading in the valve bore will be moved in a direction away from any possible deposit of solid material rather than toward the deposit.

It is the principal object of the present invention to provide seats for ball valves which will not be under compressive deformation.

It is another object to provide seats for ball valves which will permit ample manufacturing tolerances without unduly increasing the bearing load between the valve member and seats.

It is a further object to provide seats for ball valves which will be easy to manufacture and assemble.

It is a further object to provide seats for ball valves which during the application of line pressure against a closed ball will deform radially and then support the load by straight compression, and on pressure reduction will again radially recover to maintain seal contact with the ball.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a cross sectional view of a ball valve constructed in accordance with the teachings of the present invention.

FIGURE 2 is a fragmentary cross sectional view showing the seat of the valve of FIG. 1 prior to assembly.

FIG. 3 is a view similar to FIG. 2 showing the seat-ball relationship on assembly of the valve of FIG. 1, with the ball in a closed position.

FIG. 4 is a fragmentary cross sectional view of the downstream seat of the valve of FIG. 1 during operation, when the valve is closed.

Referring now to FIG. 1, the ball valve of the present invention is generally comprised of a valve body A, a rotatable spherical valve member B, detachable end members C—C, seat members D—D, and operating stem E.

The valve body A has a through passage 10 which forms a valve chamber in which the free floating, rotatable, spherical valve member B is positioned. Detachably secured to each end of the valve body A are the end members C—C. The outer ends 12 of the end members C—C are finished in such a manner to enable the valve to be incorporated into a flow system as is well known in the art. The inner ends 14 of the end members C—C are provided with annular pockets 16 in which the seats D—D are each respectively located. Each end member C—C is provided with a passage 18 which forms the inlet and outlet passageways of the valve. The rotatable valve member B is also provided with a passage 20 which aligns with the passages 18—18 in the open position of the valve to form the run of the valve. The valve member B is provided with a groove 22 which receives a mating tongue 24 of the stem E. As can be seen in FIG. 1, the groove 22 is perpendicular to the passage 20 which permits the valve member B to float against the downstream seat D in the closed position. The body A is provided with a boss 26 having a sealed passage 28 through which the operating stem E extends.

The inner end 14 of each end member C converges toward its outer end 12 and is a portion of a cone having its apex and its axis disposed coaxial with the axis of the valve bore, and with the small end 14 of the cone being directed toward the axial outer end of the end member C. A seat pocket 16 formed in each end member portion 14 is an annular groove having and outer cylindrical walls 30-32, and respectively the axes of said walls being coaxial with the run of the valve. The seat pocket 16 also has a bottom wall 34 which is perpendicular to the side walls 30-32. One of seat members D is positioned in each pocket 16.

The seat D is formed of a material having the following qualifications: impervious to inner leakage; flexible enough to conform to the spherical surface of the valve member; resistant to fluids likely to be carried by the valve; sufficient internal strength to resist excessive distortion and to resist being blown out during operation; low coefficient of friction to permit easy operation; stable characteristics over a wide temperature range; a fair degree of resiliency; easy to handle and simple to use; and economically available. While these requirements may at first appear rigorous, it has been found that one of the fluorocarbon plastics, i.e., polytetrafluoroethylene sold by DuPont under the trademark "Teflon," satisfactorily fulfills the above requirements and provides a usable material for the seat D. Depending upon the size, lading to be carried, and pressure rating, the seat D may be formed of other materials including other fluorocarbon plastics such as polychlorotrifluoroethylene (sold under the trademark "Kel-F"), nylon, other plastics, hard rubber, etc. In some instances, it may be desirable to compound the above materials with fillers, such as asbestos, glass fiber, dry lubricants, etc.

The seat member D, as illustrated in FIG. 2, in its free condition is comprised of a cylindrical inner wall 36 which is coplanar with the inner wall 30 of the seat pocket 16 and is formed with an outer wall 38 which converges toward the valve member B and is a portion of a cone having its apex and its axis disposed in coaxial relation with the run of the valve with the smaller end of the cone facing the valve member B. The seat member D is also provided with a back wall 40 having a portion 42 thereof disposed perpendicular to the inner wall 36 and a frusto conical portion 44 having its apex and axis disposed coaxial with the axis of the run of the valve and its frusto conical surface intersecting the outer wall 38. The seat member is provided with a frusto conical wall 46 facing the valve member B having its apex and axis disposed coaxial with the axis of the run of the valve.

The seat D is so proportioned that upon assembly of the valve the wall 46 facing the valve member B will contact the valve member B and rotate outwardly away from the axis of the run of the valve causing the inner wall 36 of the seat member D to lose contact with the inner wall 30 of the seat pocket 16, and the outer wall 38 of the seat member D to approach the outer wall 32 of the seat pocket 16 without making contact. The conical portion 44 of the back of the seat D also approaches the bottom wall 34 of the groove 16 without making contact. FIG. 3 illustrates the relation of the seat D, seat pocket 16 and valve member D upon assembly. It can be seen that instead of the seats D being in compressive deformation the seat members deflect or roll away from the valve member B and are restrained by the stresses forming the seat. Since the seats D are not under direct compressive deformation, the bearing loads will be greatly reduced and the tendency for migration of the Teflon will be greatly reduced. Accordingly, breakaway torque for a valve that has not been operated for a considerable length of time will not materially increase as is the case when seats have high bearing loads under compressive deformation. In addition to reducing the migration, this hoop type seat would have other attributes, one of these being that the major bearing stress would be concentrated at the tip of the seat at the point where a truncation perpendicular to the surface of the ball is located which should give an effective scraper action to clean the ball before entering the seat contact area. In addition to this, inasmuch as the principal bearing contact is near the point of the seat, pressure from an upstream source would flow nearly across the face of the seat whereas it would be prevented from flowing into the back of the seat, hence producing a force backwards into the pocket thus aiding in preventing the upstream seat from being blown out.

Since the surface 36 defining the inner periphery of the seat D is rotated away from the inner peripheral surface 30 of the seat recess, only during high pressure conditions which would occur in the closed position of the valve and since in the closed position the downstream area of the seat exposed to the bore would not normally be exposed to the line fluid, there would not be a possibility of a deposit of solid material which would prevent the surface 36 of the seat from returning to the engagement with the recess surface 30. Deposit of sufficient solid material in the space between the outer periphery of the seat and the seat recess surface 32 is not likely to occur since the valve chamber is not subjected for extended periods to the flowing lading.

The seat member is so designed that upon application of pressure the downstream seat D fully supports the valve member B at which time the load on the face 46 of the downstream seat by the valve member rotates the face outwardly until the outer wall 38 of downstream seat member contacts the outer wall 32 of the seat pocket and the conical portion 44 of the back wall of the seat member makes full contact with the bottom wall 34 of the seat pocket 16. At this time, outward rotation of the seat member is terminated. The seat is so proportioned so that when hoop action is arrested the thrust of the valve member B is supported by straight compression holding it out of contact with the inner end 14 of the end member C. This arresting of hoop or tensile movement occurs at such a point at which the tensile elastic limit of the seat material has not been exceeded thereby giving full tensile recovery on relaxation of pressure; the only deformation which occurs during the application of pressure is compressive deformation of the spherical valve member into the conical face 46 of the seat opposing the valve member B. This condition is illustrated in FIG. 4. Since the elastic limit of the material forming the seat member D has not been exceeded, the seat member D will return to the condition shown in FIG. 3 upon reduction of pressure. Accordingly, the valve will hold low pressure as well as rated pressure. Also, the major sealing area will be at a point located at the tip of the seat D and the ball load will be carried by hoop and bearing stresses. This will prevent material from entering the seat surfaces upon rotation of the valve member B.

As can be seen from the foregoing, the seat of the present invention retains the valve member by a hoop action rather than being under compressive deformation. Accordingly, seat-ball contact can be obtained with lesser bearing loads than a compressive deformation type seat. Since the internal elastic limit of the material is not exceeded by application of pressure, a reduction in pressure will permit the seat to move back to its original assembly position and retain a reduced pressure. Therefore, not only is the bearing load resulting from assembly substantially decreased over a compressive deformation type seat, but also the downstream seat can recover swiftly to hold reduced pressure. Since rotation of the seat members is induced by the plug members in a direction axially away from the bore of the valve, the space between the seat and seat pocket wall at the interior periphery of the seats will not be subject to impaction of solid material from the lading. The space will be at its greatest volume when the seat is serving as a downstream seat, but in this condition the space will not generally be in contact with the lading since the lading will have moved downstream. This construction will allow freedom of tensile stressing of the seat members even when the valve is employed in the control of slurry-type ladings.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

What I claim is:

1. In a spherical plug valve comprising a valve body having a valve chamber formed therein and flow passages in communication with the valve chamber, a rotatable plug member of generally spheroid form disposed within said valve chamber and having a passage formed therein for registry with said flow passages in the open position of said valve, means for imparting rotation to said plug member, a pair of opposed seat pockets formed in said valve body and each having a pair of radially spaced cylindrical walls formed concentrically with the flow passage and a planar bottom wall disposed in normal relation with the flow passage, a seat member disposed in each of said pockets, each of said seat members in the free condition thereof having a cylindrical inner wall defining the internal periphery thereof and a frusto-conical sealing face intersecting said cylindrical inner wall, the included angle of said frusto-conical sealing surface being such relative to the dimension of said plug that initial engagement between the plug and said frusto-conical surface will occur at the radially outer portion of the frusto-conical surface, each of said seat members having a back wall having an inner peripheral portion thereof in engagement with said bottom wall of said seat pocket and outer peripheral portion thereof in radially outwardly diverging relation with said bottom wall, said seat members each having an outer wall thereof in diverging relation with the outer wall of said seat pocket.

2. In a spherical plug valve comprising a valve body having a valve chamber formed therein and flow passages in communication with the valve chamber, a rotatable plug member of generally spheroid form disposed within said valve chamber and having a passage formed therein for registry with said flow passages in the open position of said valve, means for imparting rotation to said plug member, a pair of opposed seat pockets formed in said valve body and each having a pair of radially spaced cylindrical walls formed concentrically with the flow passage and a planar bottom wall disposed in normal relation with the flow passage, a seat member disposed in each of said pockets, each of said seat members in the free condition thereof having a cylindrical inner wall defining the internal periphery thereof and a frusto-conical sealing face in outwardly diverging relation with the respective seat pocket and intersecting said cylindrical inner wall, the included angle of said frusto-conical sealing surface being such relative to the dimension of said plug that initial engagement between the plug and said frusto-conical surface will occur at the radially outer portion of the frusto-conical surface, each of said seat members having a back wall having an annular planar inner peripheral portion thereof in engagement with said bottom wall of said seat pocket and outer frusto-conical peripheral portion thereof in radially outwardly diverging relation with said bottom wall, said seat members each having an outer wall with a portion thereof in outwardly diverging relation with the outer wall of said seat pocket.

3. A spherical plug valve for controlling the flow of a fluid lading comprising a valve body having a valve chamber formed therein and flow passages in communication with the valve chamber, a rotatable plug member of generally spheroid form disposed within said valve chamber and having a passage formed therein for registry with said flow passages in the open position of said valve, means for imparting rotation to said plug member, a pair of opposed seat pockets formed in said valve body and each having a pair of radially spaced cylindrical walls formed concentrically with the flow passage and a planar bottom wall disposed in normal relation with the flow passage, a seat member disposed in each of said pockets, each of said seat members in the free condition thereof having a cylindrical inner wall defining the internal periphery thereof and a frusto-conical sealing face in outwardly diverging relation with the respective seat pocket and intersecting said cylindrical inner wall, the included angle of said frusto-conical sealing surface being such relative to the dimension of said plug that initial engagement between the plug and said frusto-conical surface will occur at the radially outer portion of the frusto-conical surface, each of said seat members having a back wall having an annular planar inner peripheral portion thereof in engagement with said bottom wall of said seat pocket and outer frusto-conical peripheral portion thereof in radially outwardly diverging relation with said bottom wall, said seat members each having an outer wall with a portion thereof in outwardly diverging relation with the outer wall of said seat pocket, said plug member imparting radially outward movement to said seat members causing the outer wall of the seat to engage the outer wall of the seat pocket and causing the inner peripheral wall of the seat to become spaced from the inner peripheral wall of the seat pocket, whereby said seat members are prevented from becoming impacted by solid material from the lading.

4. In a spherical plug valve comprising a valve body having a valve chamber formed therein and flow passages in communication with the valve chamber, a rotatable plug member of generally spheroid form disposed within said valve chamber and having a passage formed therein for registry with said flow passages in the open position of said valve, means for imparting rotation to said plug member, a pair of opposed seat pockets formed in said valve body and each having a pair of radially spaced cylindrical walls formed concentrically with the flow passage and a planar bottom wall disposed in normal relation with the flow passage, a seat member disposed in each of said pockets, each of said seat members in the free condition thereof having a cylindrical inner wall defining the internal periphery thereof and a frusto-conical sealing face intersecting said cylindrical inner wall, the included angle of said frusto-conical sealing surface being such relative to the dimension of said plug that initial engagement between the plug and said frusto-conical surface will occur at the radially outer portion of the frusto-conical surface, each of said seat members having a back wall having an inner peripheral portion thereof in engagement with said bottom wall of said seat pocket and outer peripheral portion thereof in radially outwardly diverging relation with said bottom wall, said seat members each having an outer wall thereof in diverging relation with the outer wall of said seat pocket, upon assembly of said valve said plug member will be moved into initial sealing engagement with said seat members causing said seat members to rotate outwardly away from the axis of the flow passages causing the cylindrical inner wall of the seats to move into diverging relation with the inner wall of the respective seat pocket, the outer wall of the seat member to approach the outer wall of the respective seat pocket without making contact and the radially outer portion of said back wall to approach the bottom wall of the groove without making contact, upon the application of pressure the downstream seat will rotate further causing the back wall and outer wall of the seat to move into intimate contact respectively with the bottom and outer walls of the seat pocket.

References Cited by the Examiner
UNITED STATES PATENTS

| | | | |
|---|---|---|---|
| 2,792,196 | 5/1957 | Clade | 251—315 X |
| 2,989,990 | 6/1961 | Bass et al. | 251—172 X |
| 3,047,007 | 7/1962 | Lunken | 251—315 X |
| 3,091,428 | 5/1963 | Magos | 251—315 |
| 3,100,499 | 8/1963 | Bass | 251—172 X |
| 3,118,649 | 1/1964 | Allen et al. | 251—315 X |
| 3,146,988 | 9/1964 | Riopelle et al. | 251—315 |
| 3,193,248 | 7/1965 | Lowrey | 251—315 |

M. CARY NELSON, *Primary Examiner.*

S. SCOTT, *Assistant Examiner.*